United States Patent
Kawamoto

[11] 3,921,607
[45] Nov. 25, 1975

[54] LINER FOR AUXILIARY COMBUSTION CHAMBER

[75] Inventor: Nobuhiko Kawamoto, Tokyo, Japan

[73] Assignee: Honda Giken Kogyo Kabushiki Kaisha, Tokyo, Japan

[22] Filed: June 21, 1973

[21] Appl. No.: 372,271

[30] Foreign Application Priority Data
June 22, 1972 Japan.......................... 47-73931[U]

[52] U.S. Cl......... 123/191 S; 123/32 AA; 123/32 J; 123/32 K; 123/32 SP; 123/32 ST; 123/75 B
[51] Int. Cl.............................................. F02b 23/08
[58] Field of Search........... 123/32 C, 32 D, 32 AA, 123/32 ST, 32 SP, 32 SA, 32 SJ, 75 B, 191 S, 191 SP, 32 L

[56] References Cited
FOREIGN PATENTS OR APPLICATIONS
1,202,585   1/1960   France .............................. 123/32 L Primary Examiner—Charles J. Myhre
Assistant Examiner—Tony Argenbright
Attorney, Agent, or Firm—Lyon & Lyon

[57] ABSTRACT

An internal combustion engine has a main combustion chamber and an auxiliary combustion chamber connected by a torch opening. A thin wall metallic liner is positioned in the auxiliary chamber and insulated by a space or gap from the encircling walls of a water cooled cylinder head. The liner is formed in the shape of a cup and has low heat capacity so that it remains hot during operation of the engine and prevents condensation of fuel droplets in the rich mixture delivered to the auxiliary chamber. A second opening in the cup enables a spark plug to ignite the rich mixture and causes a torch flame to extend through the torch opening to ignite a lean mixture in the main chamber.

2 Claims, 1 Drawing Figure

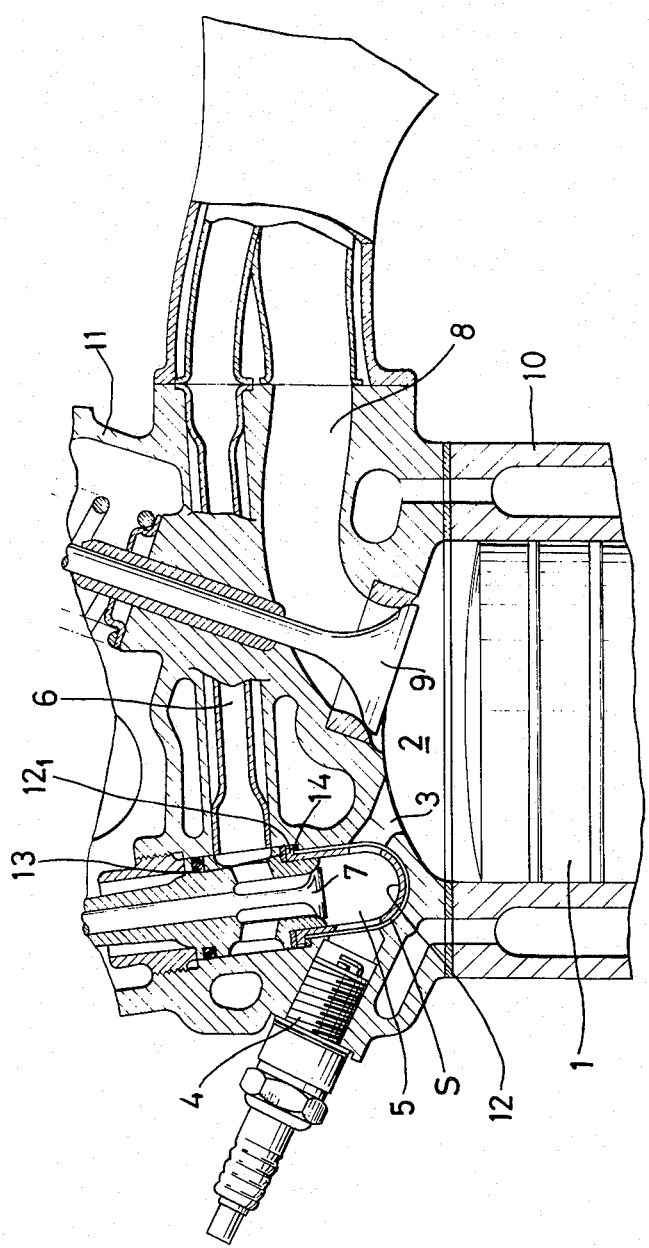

LINER FOR AUXILIARY COMBUSTION CHAMBER

This invention relates to internal combustion engines of the type having a main combustion chamber, an auxiliary combustion chamber, and a torch opening connecting the chambers. A lean mixture is delivered to the main chamber and a rich mixture is delivered to the auxiliary chamber. A spark plug ignites the rich mixture in the auxiliary chamber and causes a torch flame to extend through the torch opening to ignite the lean mixture in the main combustion chamber.

Both the engine block and the cylinder head are subjected to air cooling or water cooling, and commonly water cooling passages are provided in the engine block and cylinder head. It is desired that the rich mixture delivered to the auxiliary chamber be maintained in a gaseous form, substantially without fuel droplets, and it is desired that condensation of fuel droplets in the auxiliary chamber be minimized. Accordingly, this invention contemplates the provision of a metallic liner or cup within the auxiliary chamber, which liner or cup is insulated from the water cooled walls of the cylinder head by means of an insulating space. The cup heats up rapidly when the engine is started and remains hot so long as the engine is in operation.

Other and more detailed objects and advantages will appear hereinafter.

The drawing is a sectional elevation showing a preferred embodiment of this invention.

Referring to the drawing, the movable piston 1 forms one wall of a main combustion chamber 2 which communicates by way of torch opening with the auxiliary combustion chamber and the spark plug 4. A valve controlled intake passage (not shown) delivers a lean air-fuel mixture to the main combustion chamber 2. An intake passage 6 delivers a rich air-fuel mixture to the auxiliary combustion chamber 5 by way of the auxiliary intake valve 7. Exhaust gases pass out through the exhaust passage 8 by way of the exhaust valve 9. The engine block 10 has water cooling passages which communicate with similar passages in the cylinder head 11.

It is highly desirable that the rich air-fuel mixture delivered to the auxiliary combustion chamber 5 be hot enough to avoid condensation of fuel droplets. Accordingly, and in accordance with the invention, a metallic liner 12 is placed within the auxiliary combustion chamber 5 and isolated or insulated from the surfaces of the water cooled cylinder head 11. The liner 12 is formed of thin metal in the shape of a cylindrical cup having a hemispherical end. An air space S is maintained between the liner 12 and the cylinder head 11. A flange $12_1$ on the liner 12 at its open end is clamped between heat insulating members 13 and 14 to hold the liner 12 in position. If desired, the space S can be filled with a heat insulating material. The liner is provided with a first aperture 15 communicating with the torch opening 3 and is provided with a second aperture 16 communicating with the electrodes 17 of the spark plug 4 which are outside the liner 12.

In operation, a vaporized air-fuel mixture is admitted through the passage 6 and into the auxiliary combustion chamber 5 by way of the valve 7. At the same time a lean air-fuel mixture is drawn into the main combustion chamber 2 through a valved intake passage (not shown). At the end of the compression stroke the spark plug electrodes 17 are energized to ignite the rich mixture in the auxiliary combustion chamber 5 with the result that a torch flame extends through the torch opening to ignite the lean air-fuel mixture in the main combustion chamber 2.

The liner 12 is small in heat capacity and is thermally insulated from the cylinder head 11, so that when the engine is started up, the liner 12 is immediately heated and is thereafter kept at a high temperature during the engine operation. Condensation of liquid fuel droplets from the rich mixture is thus minimized with resulting improvement in fuel economy and reduction of pollutants in the exhaust gases discharged through passage 8. The inside surface 18 of the hemispherical end of the liner 12 serves as a fuel trap to catch any liquid droplets of fuel.

Having fully described my invention, it is to be understood that I am not to be limited to the details herein set forth but that my invention is of the full scope of the appended claims.

I claim:

1. In an internal combustion engine, the combination of: walls including a movable piston forming a main combustion chamber, walls forming a cavity for an auxiliary combustion chamber, means forming a torch opening establishing communication between said chambers, said auxiliary chamber including a thin wall metallic cup of low heat capacity, said cup being cylindrical in shape and having an upper end open and a lower end closed by a hemispherical wall, said cylindrical and hemispherical portions of the cup being mounted within but spaced from the walls of said cavity, said cup having a first aperture offset laterally from the axis of the cylindrical cup and forming at least a part of said torch opening, a spark plug having electrodes positioned in said auxiliary chamber and outside said metallic cup, said cup having a second aperture on the opposite side of said cylindrical axis from the first aperture, said apertures each being large as compared to the thin wall of said cup, said second aperture establishing communication between said spark plug electrodes and the interior of the cup, said hemispherical end of the cup below both of said apertures serving as a fuel trap to collect any liquid fuel droplets.

2. The combination set forth in claim 1 in which the open end of the cup is provided with an external flange, together with means including flange-contacting insulating parts for clamping the cup in place.

* * * * *

UNITED STATES PATENT AND TRADEMARK OFFICE
CERTIFICATE OF CORRECTION

PATENT NO. : 3,921,607
DATED : November 25, 1975
INVENTOR(S) : Nobuhiko Kawamoto It is certified that error appears in the above–identified patent and that said Letters Patent are hereby corrected as shown below:

Col. 2, line 2, after "12." insert --The apertures are large as compared to the thin wall of the cup 12.--

Signed and Sealed this ninth Day of March 1976

[SEAL]

Attest:

RUTH C. MASON
Attesting Officer

C. MARSHALL DANN
Commissioner of Patents and Trademarks